United States Patent
Seo

(10) Patent No.: US 11,436,418 B2
(45) Date of Patent: Sep. 6, 2022

(54) SYSTEM AND METHOD FOR AUTOMATICALLY TRANSLATING CHARACTERS IN IMAGE

(71) Applicant: ELECTRONICS AND TELECOMMUNICATIONS RESEARCH INSTITUTE, Daejeon (KR)

(72) Inventor: Young Ae Seo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 419 days.

(21) Appl. No.: 16/682,028

(22) Filed: Nov. 13, 2019

(65) Prior Publication Data

US 2020/0184021 A1 Jun. 11, 2020

(30) Foreign Application Priority Data

Dec. 7, 2018 (KR) .................. 10-2018-0157407

(51) Int. Cl.
```
G06F 40/58    (2020.01)
G06K 9/62     (2022.01)
G06V 10/22    (2022.01)
G06V 20/62    (2022.01)
G06V 30/10    (2022.01)
```
(52) U.S. Cl.
CPC .......... *G06F 40/58* (2020.01); *G06K 9/627* (2013.01); *G06V 10/225* (2022.01); *G06V 20/62* (2022.01); *G06V 30/10* (2022.01)

(58) Field of Classification Search
CPC ......... G06F 40/58; G06F 40/20; G06K 9/627; G06V 10/225; G06V 20/62; G06V 30/10; G06V 30/32
See application file for complete search history.

(56) References Cited

U.S. PATENT DOCUMENTS

| | | | |
|---|---|---|---|
| 8,108,202 B2 | 1/2012 | Kwon et al. | |
| 8,504,350 B2 | 8/2013 | Lee et al. | |
| 9,904,461 B1 | 2/2018 | Martynov et al. | |
| 2015/0234799 A1 | 8/2015 | Cho et al. | |
| 2015/0288870 A1* | 10/2015 | Nagaraja | H04N 5/23216 348/333.02 |

FOREIGN PATENT DOCUMENTS

| | | |
|---|---|---|
| KR | 10-2006-0065197 A | 6/2006 |
| KR | 10-2009-0132482 A | 12/2009 |
| KR | 10-2010-0007722 A | 1/2010 |
| KR | 10-2015-0097962 A | 8/2015 |

* cited by examiner

*Primary Examiner* — Qian Yang
(74) *Attorney, Agent, or Firm* — LRK Patent Law Firm

(57) ABSTRACT

Provided are a system and method for automatically translating characters in an image. In the system for automatically translating characters in an image, a processor determines, after a translation request is input, whether a signal input through an input and output interface is a character region selection signal or an autofocus request signal by analyzing the input signal, acquires a translation target region on the basis of a determination result, recognizes characters in the acquired translation target region, and then translates the recognized characters.

17 Claims, 7 Drawing Sheets

FIG. 5

What you need to know

- What happened: Five people were killed in a shooting Thursday inside the Capital Gazette newsroom in Annapolis, Maryland.
- The victims: They were all employees of the newspaper.

Capital Gazette staff writers
say they need more than
prayers

Two Capital Gazette staff writers said they need more than prayers after their fellow colleagues were killed Thursday by a gunman.

"I have heard that President Trump sent his prayers. I'm not trying to make this political, alright?" staff writer Selene San Felice said. "But we need more than prayers. I appreciate the prayers. I was praying the

FIG. 6a

What you need to know

- What happened: Five people were killed in a shooting Thursday inside the Capital Gazette newsroom in Annapolis, Maryland.
- The victims: They were all employees of the newspaper.

Capital Gazette staff writers
say they need more than
prayers

Two Capital Gazette staff writers said they need more than prayers after their fellow colleagues were killed Thursday by a gunman.

"I have heard that President Trump sent his prayers. I'm not trying to make this political, alright?" staff writer Selene San Felice said. "But we need more than prayers. I appreciate the prayers. I was praying the

FIG. 6b

What you need to know

- What happened: Five people were killed in a shooting Thursday inside the Capital Gazette newsroom in Annapolis, Maryland.
- The victims: They were all employees of the newspaper.

Capital Gazette staff writers
say they need more than
prayers

Two Capital Gazette staff writers said they need more than prayers after their fellow colleagues were killed Thursday by a gunman.

"I have heard that President Trump sent his prayers. I'm not trying to make this political, alright?" staff writer Selene San Felice said. "But we need more than prayers. I appreciate the prayers. I was praying the

FIG. 6c

What happened: Five people were killed in a shooting Thursday inside the Capital Gazette newsroom in Annapolis, Maryland.

- The victims: They were all employees of the newspaper.

Capital Gazette staff writers say they need more than prayers

Two Capital Gazette staff writers said they need more than prayers after their fellow colleagues were killed Thursday by a gunman.

"I have heard that President Trump sent his prayers. I'm not trying to make this political, alright?" staff writer Selene San Felice said. "But we need more than prayers. I appreciate the prayers. I was praying the

FIG. 6d

Capital Gazette staff writers say they need more than prayers — 61

Two Capital Gazette staff writers said they need more than prayers after their fellow colleagues were killed Thursday by a gunman.

"I have heard that President Trump sent his prayers. I'm not trying to make this political, alright?" staff writer Selene San Felice said. "But we need more than prayers. I appreciate the prayers. I was praying the

FIG. 6e

Capital Gazette staff writers say they need more than prayers

Two Capital Gazette staff writers said they need more than prayers after their fellow colleagues were killed Thursday by a gunman.

"I have heard that President Trump sent his prayers. I'm not trying to make this political, alright?" staff writer Selene San Felice said. "But we need more than prayers. I appreciate the prayers. I was praying the

FIG. 6f

Capital Gazette staff writers say they need more than prayers

62

Two Capital Gazette staff writers said they need more than prayers after their fellow colleagues were killed Thursday by a gunman.

"I have heard that President Trump sent his prayers. I'm not trying to make this political, alright?" staff writer Selene San Felice said. "But we need more than prayers. I appreciate the prayers. I was praying the

SYSTEM AND METHOD FOR AUTOMATICALLY TRANSLATING CHARACTERS IN IMAGE

CROSS-REFERENCE TO RELATED APPLICATION

This application claims priority to and the benefit of Korean Patent Application No. 10-2018-0157407, filed on Dec. 7, 2018, the disclosure of which is incorporated herein by reference in its entirety.

BACKGROUND

1. Field of the Invention

The present invention relates to a technology for translating characters in an image and, more particularly, to a system and method for automatically translating characters in an image, the system and method facilitating the use of a translation service while reducing user involvement in translating characters in an image.

2. Description of Related Art

An automatic translation service is a service for automatically converting written text in one language into written text in another language.

In many cases, existing automatic translation services are implemented to translate text which is directly input by a user through a keyboard, a mouse, a screen touch, and the like.

In the case of performing automatic translation by directly inputting text, when the text to be translated is in a form which can be electronically input, it is possible to relatively easily input the text using the copy and paste function and the like. Otherwise, there is the inconvenience that a user needs to input the text word for word by hand. In particular, when a user needs to input text in an unfamiliar foreign language, the inconvenience is increased.

In an effort to solve this problem, automatic translation services have recently been provided to perform character recognition on an image of text requiring translation, which was captured by a camera installed in a smart phone or the like, automatically translate the text from the character recognition results, and provide the translation results.

In such a service method of translating character recognition results for text in an image acquired by photography and providing the translation results, user involvement in a manner other than existing text inputting is required.

For example, instead of directly inputting text to be translated, a user needs to capture an image including text to be translated and then select the text to be translated in the captured image, as exemplified in FIG. 5.

Since it is necessary to recognize and translate text in a captured image, low image clarity renders character recognition difficult and accurate translation impossible. Therefore, a user needs to make an effort to acquire a clear image, and the need for two instances of involvement (photographing and text selection) is inconvenient. In particular, when there is a large number of characters to be translated, it is inconvenient for a user to have to perform many line drawing actions (or selecting actions such as coloring or the like).

In addition, according to a related art, a range of text to be translated is determined by rubbing an area to be translated in an image. In this method, when there is much text to be selected, a user's selection process lengthens.

SUMMARY OF THE INVENTION

The present invention is directed to providing a system and method for automatically translating characters in an image by determining a final translation target character region on the basis of a contour of a closed figure, which is input to specify a translation region, in order to facilitate the use of a translation service while reducing user involvement.

In other words, the present invention is directed to providing a system and method for specifying translation target text by only drawing a closed figure which surrounds the perimeter of the translation target text, in order to avoid the inconvenience of a related art which involves selecting all the characters of translation target text one by one.

Objectives of the present invention are not limited to those mentioned above, and other objectives which have not been described should be clearly understood by those of ordinary skill in the art from the following description.

According to an aspect of the present invention, there is provided a system for automatically translating characters in an image, the system including a processor configured to perform a function of automatically translating characters in an image by operating according to a program pre-stored in a storage module.

After a translation request is input, the processor determines whether a signal input through an input and output interface is a character region selection signal or an autofocus request signal by analyzing the input signal, acquires a translation target region on the basis of the result of the determination, performs recognition on characters in the acquired translation target region, and then translates the recognized characters.

When the translation request is input while a translation target image is displayed through the input and output interface and the input signal is determined to be a character region selection signal, the processor may acquire a character region selected by the input signal as the translation target region.

When a configuration has been set to take an image captured through a camera module as a translation target and the translation request is input, the processor may display a preview scene of an image acquired by the camera module through the input and output interface, and when the input signal is determined to be a character region selection signal, the processor may display a character region selected by the input signal in the preview scene, perform autofocusing on the character region displayed on the preview scene, and then acquire the autofocused character region as the translation target region.

When the input signal is determined to be an autofocus request signal, the processor may capture an image after performing autofocusing and then translate a translation target after selecting the translation target in a closed-figure drawing manner according to the present invention in the captured image.

According to another embodiment, autofocusing may be performed on the translation target image, and then the entire autofocused translation target image may be acquired as the translation target region.

In the process of translating the recognized characters, the processor may determine whether the input signal is a signal corresponding to a closed-figure drawing action, determine a character region to be translated on the basis of a contour of the figure in character recognition results when the input signal is a signal corresponding to a closed-figure drawing action, and translate characters in the determined character region to be translated.

In the process of determining the character region to be translated on the basis of the contour of the figure in the character recognition results, the processor may map the contour of the figure to the recognized characters, find characteristics of a character string closest to the contour among character strings inside the contour and characteristics of a character string closest to the contour among character strings outside the contour, determine a similarity by comparing the found characteristics of the internal character string and the found characteristics of the external character string, and when the determined similarity is greater than or equal to a reference similarity, extend the contour to include the external character string and determine a region in the extended contour as the character region to be translated.

The processor may determine a region in the contour mapped to the recognized characters as the character region to be translated when the determined similarity is less than the reference similarity.

The processor may translate the character recognition results when the input signal is not a signal corresponding to a closed-figure drawing action.

In a process in which a user draws a closed figure to select a character region, when the user draws an incomplete closed figure, a part of which has not been drawn as shown in FIG. 6e, and finishes selecting a character region, the system may automatically complete a contour of a closed figure by extending a contour of the figure drawn by the user and thereby select a range of text. In this case, the ratio and the like of the length of the contour of the figure drawn by the user to the length of a remaining contour of the figure to be completed by the system may be calculated. The system may consider that the user has selected the text range only when the ratio is greater than or equal to a reference value and may consider that the user has not yet selected a text range when the ratio is less than the reference value.

According to another aspect of the present invention, there is provided a method of automatically translating characters in an image, the method including: after a translation request is input, determining whether a signal input through an input and output interface is a character region selection signal or an autofocus request signal by analyzing the input signal; acquiring a translation target region on the basis of a determination result; recognizing characters in the acquired translation target region; and translating the recognized characters.

When the translation request is input while a translation target image is displayed through the input and output interface and the input signal is determined to be a character region selection signal, the acquiring of the translation target region may include acquiring a character region selected by the input signal as the translation target region.

The method may further include displaying a preview scene of an image acquired by a camera module through the input and output interface when the translation request is input, and the acquiring of the translation target region may include, when the input signal is determined to be a character region selection signal, displaying a character region selected by the input signal in a closed-figure drawing manner in the preview scene, performing autofocusing on the character region displayed on the preview scene, and then acquiring the translation target region from the autofocused character region.

Meanwhile, when the input signal is determined to be an autofocus request signal, an image may be captured after performing autofocusing, and then translation target characters may be selected in the captured image in the closed-figure drawing manner.

According to another embodiment, all content currently shown in a preview may be acquired as a translation target region according to a user's setting. In this manner, a boundary of the preview scene is considered as a boundary region drawn by a user of closed-figure drawing according to the present invention. According to this embodiment, when the user selects a region by zooming in on or out from the preview image or moving a camera close to or far from translation target text, it is possible to simultaneously determine and photograph a translation target without additionally drawing a closed figure. Therefore, user involvement is further reduced.

The translating of the recognized characters may include determining whether the input signal is a signal corresponding to a closed-figure drawing action, determining a character region to be translated on the basis of a contour of the figure in character recognition results when the input signal is a signal corresponding to the closed-figure drawing action, and translating characters in the determined character region to be translated.

The determining of the character region to be translated on the basis of the contour of the figure in the character recognition results may include mapping the contour of the figure to the recognized characters, finding characteristics of character strings closest to the contour among character strings inside the contour and characteristics of character strings closest to the contour among character strings outside the contour, determining similarity by comparing the found characteristics of the internal character string and the found characteristics of the external character string, and when the determined similarity is greater than or equal to a reference similarity, extending the contour to include the external character string and determining a region in the extended contour as the character region to be translated.

The determining of the character region to be translated may further include determining a region in the contour mapped to the recognized characters as the character region to be translated when the determined similarity is less than the reference similarity.

The translating of the recognized characters may include translating the character recognition results when the input signal is not a signal corresponding to a closed-figure drawing action.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 shows an example of a case in which a user selects a translation target from a captured region by coloring the translation target or drawing a line thereon with a fingertip, a mouse, or the like according to a related art;

FIGS. 6a, 6b, and 6c show examples of a case in which a user selects a region to be translated in an image through a closed-figure drawing action;

FIGS. 6d and 6e show examples of another type of closed-figure drawing action of a user; and FIG. 6f shows a portion determined as a translation target by closed-figure drawing exemplified in FIGS. 6d and 6e.

DETAILED DESCRIPTION OF EXEMPLARY EMBODIMENTS

Figure 1:
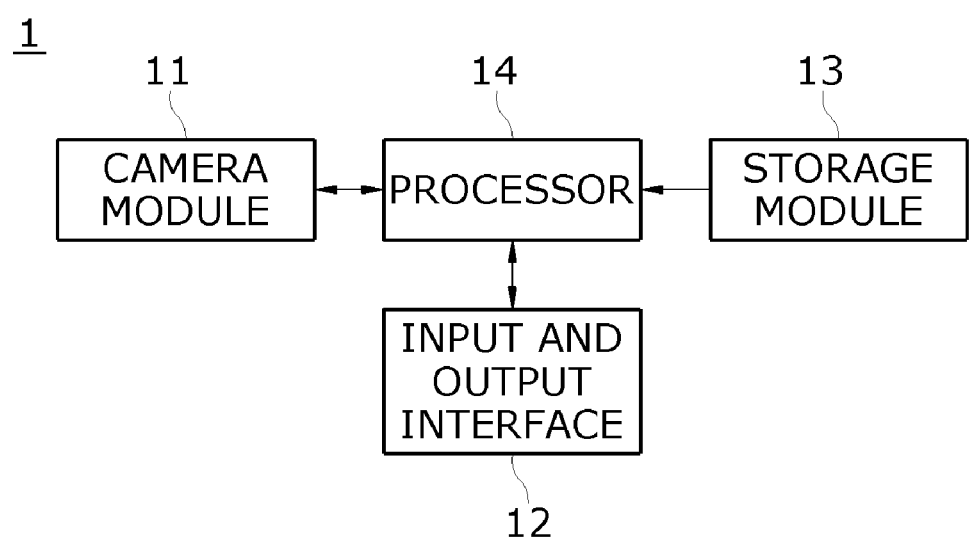
FIG. 1 is a block diagram of a system for automatically translating characters in an image according to an exemplary embodiment of the present invention.

Specific structural and functional descriptions of embodiments of the present invention disclosed herein are only for illustrative purposes of exemplary embodiments of the present invention. Embodiments of the present invention may be implemented in various forms, and the present invention should not be construed as limited to embodiments set forth herein.

While embodiments may be modified in various ways and take on various alternative forms, specific embodiments thereof are shown in the drawings and described in detail below as examples. However, there is no intent to limit the present invention to the particular forms disclosed. On the contrary, all modification, equivalents, and alternatives falling within the spirit and technical scope of the present invention are included.

Terms such as first and second may be used to describe various elements, but the elements are not limited thereto. Such terms are merely used to distinguish one element from another element. For example, a first element may be named a second element without departing from the scope of the present invention, and similarly, the second element may be named the first element.

It will be understood that, when an element is mentioned as being "connected" or "coupled" to another element, the element may be directly connected or coupled to the other element, or there may be an intervening element between the elements. On the contrary, it will be understood that, when an element is mentioned as being "directly connected" or "directly coupled" to another element, there is no intervening element between the elements. Other expressions describing relationships between elements, that is, "between" and "directly between" and "adjacent to" and "directly adjacent to," should be interpreted in the same manner.

The terms used herein are for the purpose of describing specific embodiments only and are not intended to limit the present invention. As used herein, the singular forms are intended to include the plural forms as well unless the context clearly indicates otherwise. The terms "include" or "have" used herein indicate the presence of disclosed features, numbers, steps, operations, elements, parts, or a combination thereof and do not preclude the presence or addition of one or more other features, numbers, steps, operations, elements, parts, or a combination thereof.

All of the terms used herein including technical or scientific terms have the same meaning as those generally understood by those of ordinary skill in the art to which the present invention pertains unless defined otherwise. The terms defined in a generally used dictionary should be interpreted as having the same meanings as the contextual meanings of the relevant technology and should not be interpreted as having idealized or exaggerated meanings unless clearly defined herein.

Meanwhile, when an embodiment can be implemented in a different way, functions or operations noted in specific blocks may be performed out of the order noted in the flowchart. For example, two consecutive blocks may be performed substantially concurrently, or the blocks may be performed in reverse order, depending on the functionality or operation involved.

The present invention relates to a technology for recognizing a sentence in an image and then translating the sentence. In the present invention, the image may be a previously captured image or an image newly captured for translation.

Accordingly, the present invention may be applied to the case of selecting a text range for automatic translation in a previously captured image and the case of selecting a text range for automatic translation in an image captured by photography.

Since the case of selecting a text range for automatic translation in an image captured by photography includes the case of selecting a text range for automatic translation in a previously captured image, examples including photographing will be mainly described below.

Hereinafter, a system and method for automatically translating characters in an image according to exemplary embodiments of the present invention will be described in detail with reference to the accompanying drawings.

FIG. 1 is a block diagram of a system for automatically translating characters in an image according to an exemplary embodiment of the present invention.

As shown in FIG. 1, a system 1 for automatically translating characters in an image (hereinafter "system") according to an exemplary embodiment of the present invention may be applied to various devices including portable devices such as smart phones having a camera function, desktop computers for performing automatic translation on an image, and the like.

The system 1 may include a camera module 11, an input and output interface 12, a storage module 13, and a processor 14, but the configuration of the system 1 is not limited thereto.

The camera module 11 photographs a subject including translation target text and transfers the acquired image to the processor 14.

The input and output interface 12 displays data from the processor 14 or converts an input signal into the corresponding information and transfers the information to the processor 14. The input and output interface 12 may be implemented as a touch screen but is not limited thereto.

The storage module 13 stores a program, an algorithm, data, etc. required for the system 1 to operate and stores data generated according to operation of the system 1.

The processor 14 controls the operation of the camera module 11, the input and output interface 12, and the storage module 13, determines translation target text in the image captured by the camera module 11, and performs translation.

Figure 2:
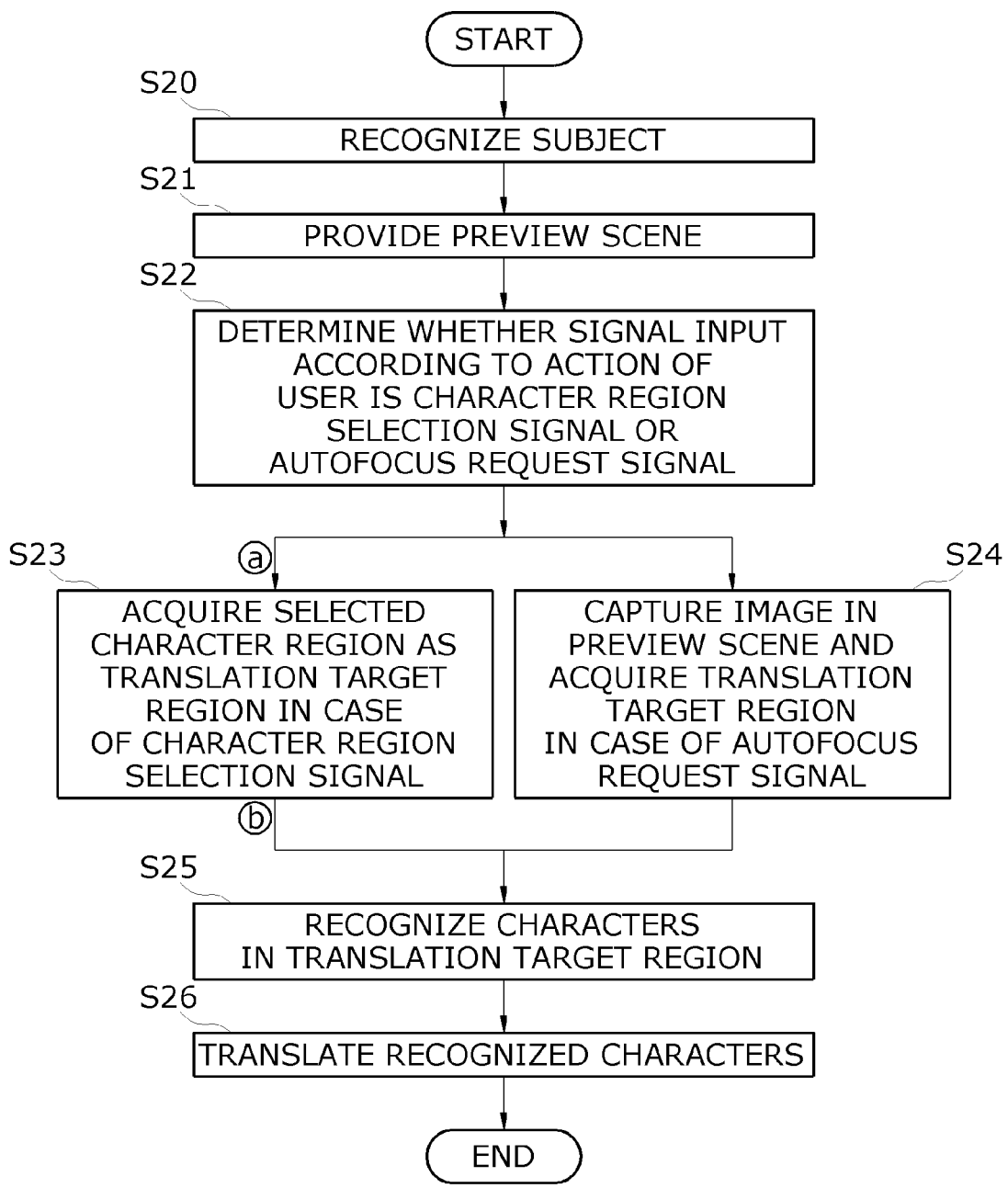
FIG. 2 is a flowchart illustrating the operation of a processor of the system for automatically translating characters in an image according to an exemplary embodiment of the present invention.

The operation of the processor 14 will be described in detail below with reference to FIG. 2.

When a translation program is executed, the processor 14 controls the camera module 11 to perform a photographing operation and provides a preview scene of the subject recognized (S20) by the camera module 11 through the input and output interface 12 (S21).

After the preview scene is provided through the input and output interface 12 in the operation S21, a user inputs a signal through the input and output interface 12 on the basis of a preset action, and the signal input through the input and output interface 12 is transferred to the processor 14.

For example, when the input and output interface 12 is implemented as a touch screen, the user may input a signal on the basis of the action of touching the screen.

Accordingly, after the operation S21, the processor 14 analyzes the signal input through the input and output interface 12 and determines whether the input signal is a closed-figure drawing manner character region selection signal according to the present invention or an autofocus request signal (S22).

To make a determination in the operation S22, the processor 14 may refer to information on types of character region selection signals and types of autofocus request signals, and such information may be stored in, for example, the storage module 13.

For example, the processor 14 may determine the input signal to be a character region selection signal when the input signal may be considered as the action of drawing a closed figure as exemplified in FIGS. 6a to 6e, and may determine the input signal to be an autofocus request signal when the input signal corresponds to the action of touching a small portion.

A signal, which may be considered as the action of drawing a closed figure according to the present invention, will be described in further detail. As shown in FIG. 6a, the system 1 may provide a quadrangular frame in advance, and a character region selection signal may be input to specify translation target text while adjusting the size, shape, and position of the previously provided frame according to an input of the user, for example, a drag or a mouse operation in the preview scene.

Alternatively, as shown in FIGS. 6b and 6c, a character region selection signal may be input when the user personally draws a closed figure surrounding the translation target text with a fingertip or a mouse.

To further improve user convenience, as shown in FIG. 6d or 6e, a character region selection signal may be input by roughly marking a translation target region with a fingertip or a mouse without surrounding the entire translation target text.

Here, it is possible to various change a configuration for the processor 14 to determine, when a signal is input, whether the input signal is a character region selection signal or an autofocus request signal.

Although in above embodiment the image is captured by camera module 11, present invention is not limited in above exemplary case. There may be many alteration and modifications. For example, the image of present invention may be not only presently captured photo image but also previously captured photo image and various types of digital documents (html webpage, MS-word, excel, ppt, pdf, e-mail, etc.). To acquire digital documents other input module (not shown) can be used.

After the operation S22, the processor 14 acquires a translation target region on the basis of the determination result and recognizes characters in the acquired translation target region.

Specifically, when the input signal is determined to be a character region selection signal in the operation S22, the processor 14 acquires a character region selected by the input signal as a translation target region (S23).

The operation S23 will be described in further detail below with reference to FIG. 3. Before the description, a case in which the input signal is determined to be an autofocus request signal in the operation S22 will be briefly described.

According to a fundamental embodiment, when the input signal is determined to be an autofocus request signal, the processor 14 performs autofocusing on the image in the preview scene and then photographs the image. After the photographing, the processor 14 selects and acquires translation target text in a preview scene of the captured image (S23).

The reason that such a function is provided is that the user may not want to draw a figure on a shaking screen to select a character region in the preview scene or may want to capture an image and also perform translation. In other words, photographing is performed after autofocusing, and a captured image is previewed. Then, the user selects a character region in the previewed image. This is the same as a process of loading a previously captured image and selecting a character region.

Regardless of selecting translation target text in a preview scene before photographing or selecting translation target text in a captured image after photographing, both the cases are within the scope of the present invention as long as a translation target is selected in the closed-figure drawing manner which is the core technical spirit of the present invention.

Meanwhile, when the input signal for the preview image is determined to be an autofocus signal, the following extended embodiment is possible. For example, all content currently shown in the preview may be acquired as a translation target region according to a mode setting. In this manner, the boundary of the preview scene is considered as a boundary region drawn by the user of closed-figure drawing according to the present invention. According to this embodiment, when the user selects a region by zooming in on or out from the preview image or moving a camera close to or far from translation target text, it is possible to simultaneously determine and photograph a translation target without additionally drawing a closed figure. Therefore, user involvement may be further reduced. A case in which a user draws a closed figure for translation target text in a preview scene or a captured image may fundamentally belong to the same category as a case in which a user selects translation target text by adjusting the boundary of a preview scene while considering the boundary of a preview scene as the boundary of a closed figure.

The above-described fundamental and extended embodiments may be performed according to a mode selection of a user after modes are set in advance. Alternatively, different user inputs may be set for an autofocus signal for photography or a signal for using the closed-figure drawing manner by considering a preview scene as a boundary, such that each operation of the fundamental and extended embodiments may be selectively performed. For example, autofocus for photography may involve touching a preview scene once, and autofocus for determining a translation target with a preview boundary may involve touching a preview scene two times within a short time. However, a system and method according to the present invention are not limited to such an exemplary user interface manner.

After the operation S23 or the operation S24, the processor 14 recognizes characters in the translation target region (S25). Then, the processor 14 translates the recognized characters (S26) and provides the translation results to a preset device.

With regard to the operation S23 in FIG. 2, a preview shown after a character region selection signal is input will be described in detail below with reference to FIG. 3.

Figure 3:
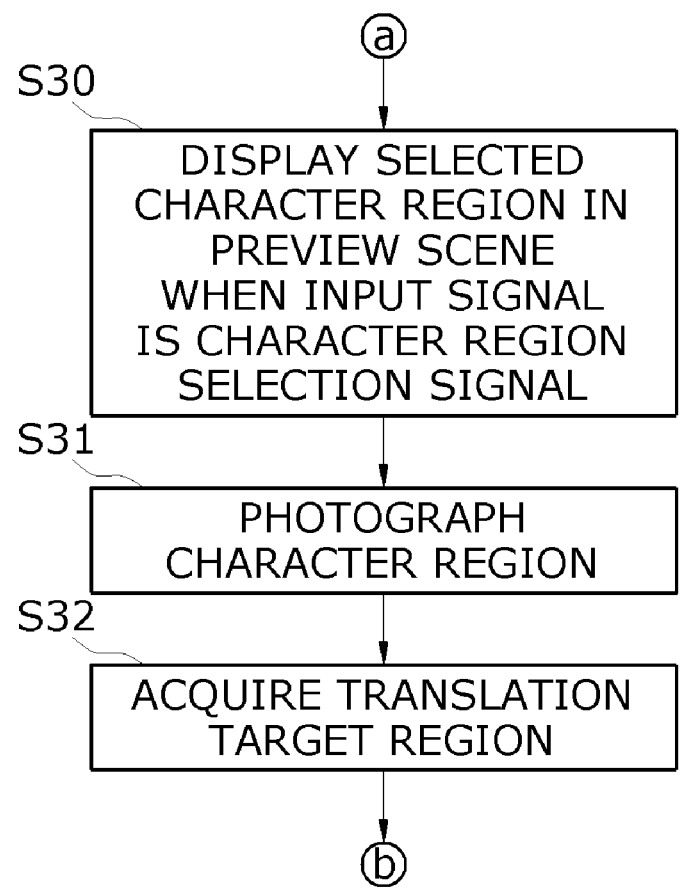
FIG. 3 is a flowchart illustrating an operation S23 in detail in the operation of the processor of the system for automatically translating characters in an image according to an exemplary embodiment of the present invention.

Referring to FIG. 3, when the input signal is determined to be a character region selection signal, the processor 14 displays a character region selected by the user's action on the preview scene (S30).

In the operation S30, the processor 14 may display the character region to overlap the image shown in the preview scene, but a method of displaying the character region is not limited thereto.

For example, the processor 14 may display the entire photographing target and translation target text specified therein in the closed-figure drawing manner in the preview scene as shown in FIGS. 6b to 6f, display only the translation target text in the preview scene, or leave a blank by reducing the previously displayed image and then display the character region in the blank.

After the operation S30, the processor 14 photographs the character region (S31) and then acquires the translation target region (S32). It is better to perform autofocusing on the specified translation target text immediately before photographing.

The operation S23 in FIG. 2 will be described in further detail below as a procedure for determining translation target text with reference to FIG. 4.

Figure 4:
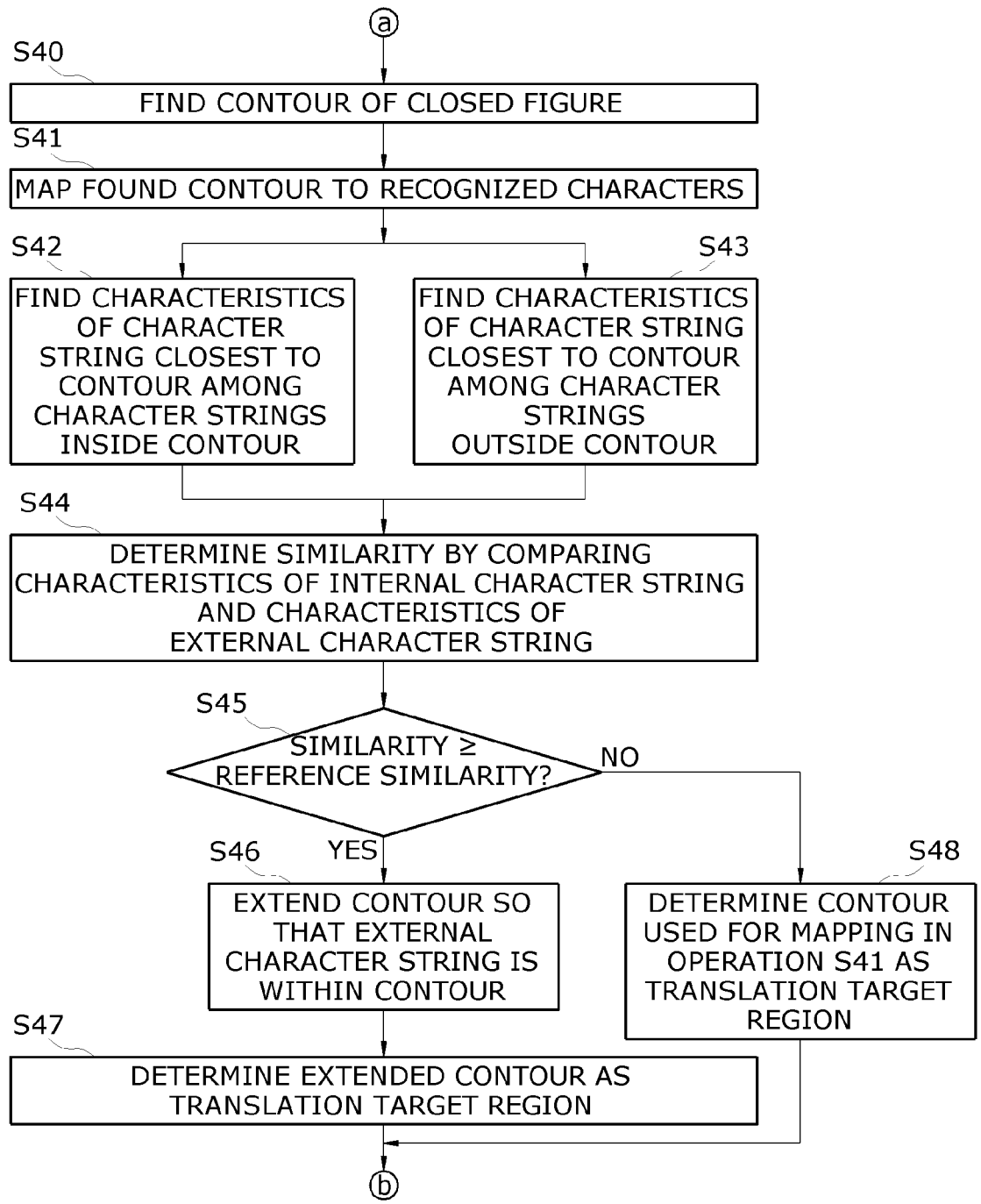
FIG. 4 is a flowchart illustrating an operation S23 in detail in the operation of a processor of the system for automatically translating characters in an image according to an exemplary embodiment of the present invention.

Referring to FIG. 4, when the input signal of the operation S22 is a signal corresponding to a closed-figure drawing action, the processor 14 finds a contour of the closed figure (S40) and maps the found contour to recognized characters (a region estimated as characters, character strings, sentences, paragraphs, etc. in terms of shape because it is before content recognition) (S41).

When the mapping result shows that the closed figure completely surrounds the region estimated as characters, sentences, or paragraphs as shown in FIGS. 6a to 6c, the characters, sentences, or paragraphs in the closed figure are determined as translation target text, and the process proceeds to operation S25 for content recognition and translation.

On the other hand, when it is hard to consider that the closed figure completely surrounds translation target text as shown in FIG. 6d, the closed figure is expanded through operations S42 to S48 such that translation target text is determined.

In other words, after the operation S41, the processor 14 finds characteristics of a character string closest to the contour among character strings inside the contour (S42) and finds characteristics of a character string closest to the contour among character strings outside the contour (S43) on the basis of the mapping result.

Character string characteristics found in the operations S42 and S43 may include interval information between character strings, interval information between character string lines, character size information, character color information, character font information, and the like.

After the operation S43, the processor 14 determines similarity by comparing characteristics of the internal character string and the characteristics of the external character string found in the operation S42 (S44) and determines whether the determined similarity is greater than or equal to a preset reference similarity (S45).

In the operation S44, the similarity may be differently determined according to types of the found character string characteristics. To determine the similarity, weights may be applied to the respective character string characteristics, but the present invention is not limited to any similarity determination method.

When it is determined in the operation S45 that the determined similarity is greater than or equal to the reference similarity (Yes in S45), the processor 14 considers that the internal character string and the external character string are continuous character strings and extends the contour of the closed figure to include the external character string (S46).

After the operation S46, the processor 14 determines a region in the extended contour as a character region to be translated (S47). In other words, translation target text is determined as shown in FIG. 6f.

When it is determined in the operation S45 that the determined similarity is less than the reference similarity (No in S45), the processor 14 determines a region in the contour used for mapping in the operation S41 as a character region to be translated (S48).

Meanwhile, to improve user convenience, the system and method according to the present invention make it possible to determine translation target text through a closed figure which does not form a complete loop. For example, when a contour of a closed figure is incompletely drawn as shown in FIG. 6e, the system completes the contour of a closed figure by extending the contour of the figure drawn by the user and then performs the operation S41. Therefore, even when the user draws an incomplete closed figure, text in a range shown in FIG. 6f is selected as translation target text in the same way as shown in FIG. 6d.

Even in the case of an incomplete figure, the system may calculate the ratio of the length of a contour of the figure drawn by the user to the length of a remaining contour of the figure to be completed by the system. The system may recognize the incomplete figure as a closed-figure drawing and consider that the user has selected a text range when the ratio is greater than or equal to a reference value and may consider that the user has not yet selected a text range when the ratio is less than the reference value. In other words, when the user draws an excessively small part of a closed figure and stops drawing, it is possible to consider that a text selection has been canceled.

A technology for automatically translating characters in an image according to the present invention has been described above on the basis of the operation in the case of newly acquiring an image which is a translation target, but the technology for automatically translating characters in an image according to the present invention may also be applied to a previously captured image, a previously made webpage, a previously made digital document or the like (e.g. word, pdf, excel, e-mail, etc.).

According to the inventive technology for automatically translating characters in an image, a final translation target character region is determined on the basis of the contour of a closed figure which is input to specify a translation region, and automatic translation is performed.

Therefore, characters of a region desired by a user can be translated on the basis of one action of the user.

Accordingly, in the case of translating characters in an image, user involvement is reduced such that convenience may be improved. Also, since the inventive technology is similar to a manner which is used to specify a certain target in daily life, it is possible to provide a user interface which is more intuitive and familiar to each user.

Although all elements constituting each described embodiment have been described as being integrated or operating in combination, the present invention is not limited to such an embodiment. In other words, within the scope of the present invention, one or more of the elements may selectively operate in combination. Further, each of the elements may be implemented by each independent piece of hardware, or some or all of the elements may be selectively combined and implemented by a computer program having a program module which performs some or all of combined functions in a plurality of pieces of hardware. Such a computer program may be stored in computer-readable storage media, such as a universal serial bus (USB) memory, a compact disc read-only memory (CD-ROM), and a flash memory, and read and executed by a computer, such that embodiments of the present invention may be implemented. Recording media of the computer program may include a magnetic recording medium, an optical recording medium, a carrier wave medium, and the like.

An inventive system and method for automatically translating characters in an image have been described above according to exemplary embodiments. However, the scope of the present invention is not limited to a specific embodiment, and various alterations, modifications, and changes can be made within the scope evident to those of ordinary skill in the art to which the present invention pertains.

Therefore, the disclosed embodiments of the present invention are intended not to limit but to describe the technical spirit of the present invention, and the technical spirit of the present invention is not limited to the embodiments and the accompanying drawings. The scope of the present invention is defined by the claims, and it should be understood that the present invention encompasses all differences within the equivalents thereof.

What is claimed is:

1. A system for automatically translating characters in an image, the system comprising:
   a processor configured to perform a function of automatically translating characters in an image by operating according to a program pre-stored in a storage module,
   wherein when a signal input through an input and output interface is determined to be a signal for selecting a character region of a closed figure by analyzing the input signal after a translation request is input, the processor acquires a translation target region, recognizes characters in the acquired translation target region, and then translates the recognized characters,
   wherein in a process of determining the character region to be translated on the basis of a contour of the figure in the character recognition results, the processor maps the contour of the figure to the recognized characters, finds characteristics of a character string closest to the contour among character strings inside the contour and characteristics of a character string closest to the contour among character strings outside the contour, determines a similarity by comparing the found characteristics of the internal character string and the found characteristics of the external character string, and determines a region in the contour or an extended contour as the character region to be translated based on the determined similarity.

2. The system of claim 1, wherein when the translation request is input while a translation target image is displayed through the input and output interface, and the input signal is determined to be a character region selection signal, the processor acquires a character region selected by the input signal as the translation target region.

3. The system of claim 1, wherein:
   when a configuration has been set to take an image captured through a camera module as a translation target and the translation request is input, the processor displays a preview scene of the image acquired by the camera module through the input and output interface, and
   when the input signal is determined to be a character region selection signal, the processor displays a character region selected by the input signal in the preview scene, performs autofocusing on the character region displayed on the preview scene, and then acquires the autofocused character region as the translation target region.

4. The system of claim 1, wherein when the input signal is determined to be an autofocus request signal, the processor performs autofocusing on a translation target image and then acquires the autofocused translation target image as the translation target region.

5. The system of claim 1, wherein the processor extends the contour to include the external character string when the determined similarity is greater than or equal to a reference similarity, and determines a region in the extended contour as the character region to be translated.

6. The system of claim 5, wherein the processor determines a region in the contour mapped to the recognized characters as a character region to be translated when the determined similarity is less than the reference similarity.

7. The system of claim 1, wherein the processor translates the character recognition results when the input signal is not a signal corresponding to a closed-figure drawing action.

8. The system of claim 1, wherein when the input signal is a signal corresponding to an action of drawing a contour of an incomplete closed-figure, the processor extends the contour of the incomplete closed-figure to complete the contour of the closed-figure, and maps the contour of the figure to the recognized characters.

9. The system of claim 8, wherein when a ratio of a length of a boundary line of the incomplete closed-figure is equal to or greater than a reference value, the processor recognizes the input signal as a closed-figure drawing and determines that a user has selected a text range corresponding to the translation target region.

10. A method of automatically translating characters in an image, the method comprising:
   after a translation request is input, determining whether a signal input through an input and output interface is a character region selection signal by analyzing the input signal;
   acquiring a translation target region on the basis of the determination result;
   recognizing characters in the acquired translation target region;
   translating the recognized characters; and
   determining a character region to be translated on the basis of a contour of a closed figure in the character recognition results,
   wherein the determining of the character region to be translated comprises mapping the contour of the figure to the recognized characters, finding characteristics of a character string closest to the contour among character strings inside the contour and characteristics of a character string closest to the contour among character strings outside the contour, determining a similarity by comparing the found characteristics of the internal character string and the found characteristics of the external character string, and determining a region in the contour or an extended contour as the character region to be translated based on the determined similarity.

11. The method of claim 10, wherein when the translation request is input while a translation target image is displayed through the input and output interface, and the input signal is determined to be the character region selection signal, the acquiring of the translation target region comprises acquiring a character region selected by the input signal as the translation target region.

12. The method of claim 10, further comprising displaying a preview scene of an image acquired by a camera module through the input and output interface when the translation request is input,
 wherein the acquiring of the translation target region comprises, when the input signal is determined to be the character region selection signal, displaying a character region selected by the input signal in the preview scene and acquiring the character region displayed in the preview scene as the translation target region.

13. The method of claim 10, wherein the determining of the character region to be translated further comprises extending the contour to include the external character string when the determined similarity is greater than or equal to a reference similarity, and determining a region in the extended contour as the character region to be translated.

14. The method of claim 13, wherein the determining of the character region to be translated further comprises determining a region in the contour mapped to the recognized characters as the character region to be translated when the determined similarity is less than the reference similarity.

15. The method of claim 10, wherein the translating of the characters comprises translating the character recognition results when the input signal is not a signal corresponding to a closed-figure drawing action.

16. The method of claim 10, wherein the determining whether a signal input is a character region selection signal comprises, when the input signal is a signal corresponding to an action of drawing a contour of an incomplete closed-figure, extends the contour of the incomplete closed-figure to complete the contour of the closed-figure, and maps the contour of the figure to the recognized characters.

17. The method of claim 16, wherein the determining whether a signal input is a character region selection signal comprises, when a ratio of a length of a boundary line of the incomplete closed-figure is equal to or greater than a reference value, recognizes the input signal as a closed-figure drawing and determines that a user has selected a text range corresponding to the translation target region.

* * * * *